United States Patent [19]

Batchelder et al.

[11] Patent Number: 5,402,351

[45] Date of Patent: Mar. 28, 1995

[54] MODEL GENERATION SYSTEM HAVING CLOSED-LOOP EXTRUSION NOZZLE POSITIONING

[75] Inventors: John S. Batchelder, Somers; Huntington W. Curtis, Chelsea; Douglas S. Goodman; Franklin Gracer, both of Yorktown Heights; Robert R. Jackson, Millbrook; George M. Koppelman, New York; John D. Mackay, Pound Ridge, all of N.Y.

[73] Assignee: International Business Machines Corporation, Armonk, N.Y.

[21] Appl. No.: 183,512

[22] Filed: Jan. 18, 1994

Related U.S. Application Data

[60] Division of Ser. No. 34,180, Mar. 22, 1993, Pat. No. 5,303,141, which is a continuation of Ser. No. 637,570, Jan. 3, 1991, abandoned.

[51] Int. Cl.$^6$ ............................................. G06F 15/46
[52] U.S. Cl. .................................... 364/468; 395/119; 264/22; 364/474.24
[58] Field of Search .......................... 364/468, 474.24; 395/118–120; 264/22, 40.1; 425/135; 156/59, 350

[56] References Cited

U.S. PATENT DOCUMENTS

| | | |
|---|---|---|
| 3,046,178 | 7/1962 | Tupper . |
| 3,206,899 | 9/1965 | Wright . |
| 4,564,410 | 1/1986 | Clitheros et al. . |
| 4,575,330 | 3/1986 | Hull .................................... 264/22 |
| 4,665,492 | 5/1987 | Masters ............................ 364/468 |

(List continued on next page.)

FOREIGN PATENT DOCUMENTS

| | | |
|---|---|---|
| 2583333 | 6/1985 | France . |
| 2583334 | 6/1985 | France . |
| 62-255124 | 11/1987 | Japan . |
| 1-78822 | 3/1989 | Japan . |

OTHER PUBLICATIONS

"Shape Melting Technology" by Thomas E. Doyle et al. p. 55, Jun. 4–5, 1990, The National Conference on Rapid Prototyping.

(List continued on next page.)

Primary Examiner—Roy N. Envall, Jr.
Assistant Examiner—Steven R. Garland
Attorney, Agent, or Firm—Perman & Green

[57] ABSTRACT

Disclosed are methods and apparatus for fabricating a three-dimensional object in accordance with a computer-generated definition of the object that is stored within a memory. A method includes the steps of (a) evaluating the stored definition of the object to locate any un-supported features of the object; in response to locating an un-supported feature, (b) defining a support structure for the un-supported feature; (c) generating a fabrication tool movement list expressive of movements required by a fabrication tool to fabricate the object and any defined support structures; and (d) translating the fabrication tool in accordance with the generated fabrication tool movement list to fabricate the object and any defined support structures. The step of translating includes the steps of, generating a feedback signal that is indicative of at least one characteristic of a most recently fabricated portion of the object; and monitoring the feedback signal to detect a deviation of at least a location of the most recently fabricated portion of the object from a corresponding location as expressed in the associated portion of the fabrication tool movement list. Also disclosed are methods and apparatus for anti-aliasing aliased surface features of the object, representing the object definition in a vector format, generating a bit-mapped representation of the object, and an analysis of the definition of the object to identify and subsequently compensate for a region of the object that has a potential to retain heat during fabrication.

15 Claims, 5 Drawing Sheets

U.S. PATENT DOCUMENTS

| | | | |
|---|---|---|---|
| 4,724,302 | 2/1988 | Penney et al. | 156/350 |
| 4,752,352 | 6/1988 | Feygin | 156/59 |
| 4,752,498 | 6/1988 | Fudium | 264/22 |
| 4,801,477 | 1/1989 | Fudium | 264/22 |
| 4,844,144 | 7/1989 | Murphy et al. | |
| 4,857,694 | 8/1989 | Doyle et al. | |
| 4,890,235 | 12/1989 | Reger et al. | 364/468 |
| 4,915,757 | 4/1990 | Rando | 156/59 |
| 4,961,154 | 10/1990 | Pomerantz et al. | 264/22 |
| 5,031,120 | 7/1991 | Pomerantz et al. | 364/474.24 |
| 5,121,329 | 6/1992 | Crump | 364/468 |
| 5,134,569 | 7/1992 | Masters | 364/474.24 |
| 5,141,680 | 8/1992 | Almquist et al. | 425/135 |
| 5,209,878 | 5/1993 | Smalley et al. | 264/22 |
| 5,216,616 | 6/1993 | Mastens | 364/474.24 |
| 5,256,340 | 10/1993 | Allison et al. | 264/22 |

OTHER PUBLICATIONS

"Laser Modeling Reduces Engineering Time" by D. A. Belforte, Laser Focus World, Jun. 1989, pp. 103–108.

"3D Modeler Models in Minutes" Product Brochure of Stratasys, Inc. Minneapolis, Min. 1990.

Kodama, "Automatic method for fabricating a three-dimensional plastic model with photo-hardening polymer", Rev. Sci. Instrum., vol. 52, No. 11, Nov. 1991, pp. 1770–1773.

MODEL GENERATION SYSTEM HAVING CLOSED-LOOP EXTRUSION NOZZLE POSITIONING

CROSS-REFERENCE TO RELATED PATENT APPLICATIONS

This patent application is a divisional of U.S. patent application Ser. No. 08/034,180, filed Mar. 22, 1993, now U.S. Pat. No. 5,303,141, which is a continuation of U.S. patent application Ser. No. 07/637,570, filed Jan. 3, 1991, (abandoned).

FIELD OF THE INVENTION

This invention relates generally to computer-controlled extrusion systems and, in particular, to a system that extrudes material through a nozzle under the control of a data processing system having a closed-loop nozzle positioning system to fabricate a CAD-defined structure.

BACKGROUND OF THE INVENTION

With the increased use of Computer Aided Design (CAD) solid modeling systems a need has developed to translate the CAD output data into a structural component. Forming objects automatically in three dimensions is useful in testing for input CAD errors, part functionality, assessing aesthetics, mold formation by subtractive wax, and small production runs. While some of these applications are somewhat insensitive to short and long range dimensional errors, such as the assessing of aesthetics, other applications are moderately sensitive to error, such as testing part functionality. Still other applications, such as mold manufacturing, are extremely sensitive to dimensional errors.

Automated three dimensional part "printing" techniques that are currently available exhibit generally poor long range dimensional tolerance. A best dimensional tolerance of any presently published technique is approximately one mil over 500 mils, achieved through a binder-droplet-jet-on alumina-powder technique. However, this system was demonstrated only with a simple cartesian grid structure.

While many currently available prototype printing tools are able to make structures with features down to 5-10 mils, the long range change in dimensional accuracy and stability is approximately 5%. The classic test of the dimensional accuracy of a three dimensional prototyping tool is the "T-party". A t-shaped structure having vertical and horizontal bars several inches long is fabricated. The dimensions of the structure are then checked immediately after fabrication, after curing, after several days, and finally after several months. Typically, not only does the length of the bars change by a few percent at each measurement, but the amount of bow in the top bar changes with time as well.

One commercially available system employs software to slice a computer generated solid model, represented by CAD data, into thin cross sections. The cross sections are then physically created by scanning a spot of ultraviolet laser light over a top surface of a reservoir or bath of liquid photopolymer. The scanned laser spot partially cures the photopolymer, changing it from a liquid to a solid. After forming a given layer a supporting stage is lowered within the both by the thickness of the layer created. The scanning process is repeated for the next layer until the structure is completed. After fabrication a subsequent step is typically required to fully cure all of the photopolymer that may be trapped within the partially cured material. Dimensional changes to the structure may occur during this subsequent photopolymerization step.

The following three U.S. patents all teach aspects of photopolymer systems: U.S. Pat. No. 4,565,330, issued Mar. 11, 1986, entitled "Apparatus for Production of Three-Dimensional Objects by Stereolithography" (Hull); U.S. Pat. No. 4,752,498, issued Jun. 21, 1988, entitled "Method and Apparatus for Production of Three-Dimensional Objects by Photosolidification" (Fudim); and U.S. Pat. No. 4,801,477, issued Jan. 31, 1989, entitled "Method and Apparatus for Production of Three-Dimensional Objects by Photosolidification" (Fudim).

Another type of commercially available system employs a laser to sinter a thin layer of powder into the desired shape of each layer.

In general, the photopolymerization and sintering systems are relatively expensive and require a significant amount of time to generate a finished part of average complexity from the input CAD data.

Another commercially available system employs a heated nozzle to extrude a melted material such as nylon wire or a wax. The nozzle is translated under the control of a computer system in accordance with previously sliced CAD data.

The following U.S. Patents are of interest in the field of computer or CAD-defined three dimensional structure fabrication. In U.S. Pat. No. 4,915,757, issued Apr. 10, 1990, entitled "Creation of Three-Dimensional Objects" Rando teaches the machining of a part by laser ablation. In U.S. Pat. No. 4,665,492, issued May 12, 1987, entitled "Computer Automated Manufacturing Process and System" Masters teaches part fabrication by spraying drops or particles. U.S. Pat. No. 4,857,694, issued Aug. 15, 1989, entitled "Method and Apparatus for Automatic Vapor Cooling When Shape Melting a Component" to Doyle et al. relates to cooling shape melted parts. In U.S. Pat. No. 4,890,235, issued Dec. 26, 1989, entitled "Computer Aided Prescription of Specialized Seats for Wheelchairs or other Body Supports" Reger et al. teach the deformation of a surface to create a contour. And finally, in U.S. Pat. No. 4,844,144, issued Jul. 4, 1989, entitled "Investment Casting Utilizing Patterns Produced by Stereolithography" Murphy et al. disclose a method of investment casting utilizing a pattern produced by stereolithography.

What is not taught by this prior art, and what is thus an object of this invention to provide, is a CAD "printing" system for producing a three dimensional structure from CAD data, the system being achieved at relatively low cost while providing high dimensional accuracy, with respect to systems of the prior art.

It is a further object of the invention to provide deposition feedback for providing a closed-loop computer-controlled CAD-generated object fabrication system.

It is another object of the invention to provide methods of generating support structures and anti-aliasing features for a CAD-defined object to facilitate the computer controlled fabrication thereof.

SUMMARY OF THE INVENTION

The foregoing and other problems are overcome and the objects of the invention are realized by a system, and a method for operating same, for fabricating a three-dimensional object in accordance with a specification of the object. The system includes a nozzle for extruding a material; apparatus for controllably positioning the nozzle in accordance with the specification; and apparatus for generating a feedback signal that is indicative of at least one characteristic of a most recently extruded portion of the material.

In one embodiment the feedback generating apparatus includes a visual or infrared emission imaging system. In another embodiment the feedback generating apparatus includes a proximity detecting apparatus such as a capacitive sensor, a tactile sensor, or a pneumatic sensor.

The positioning apparatus is responsive to a nozzle movement list stored within a controller for translating the nozzle horizontally within an x-y plane and further comprises an object supporting stage that is translated vertically along a z-axis. The positioning apparatus is also operable for translating the nozzle in the z-axis.

The material may be comprised of, but is not limited to, one or more of the following materials including adhesives, waxes, thermoplastic polymers, thermoset polymers, resins, metallic alloys, glasses, epoxy resins, silicone adhesives, and combinations thereof. The material may also include combinations containing dissimilar materials added to impart a desired electrical or structural characteristic to the material. One presently preferred material is a hot melt adhesive that exhibits a high adhesion to previously extruded material, thereby facilitating the formation of horizontally disposed un-supported rows and also spans of extruded material. The hot melt adhesive also exhibits good short-term and long-term dimensional stability.

Further in accordance with a method of the invention there is described a method for fabricating a three-dimensional object in accordance with a computer-generated detection of the object. This method includes the steps of testing a stored definition of the object to locate any un-supported features of the object and, in response to locating an un-supported feature, defining a support structure for the un-supported feature. This method further includes the steps of generating a fabrication tool movement list expressive of movements required by the fabrication tool to fabricate the object and the support structures, if any; and translating the fabrication tool in accordance with the generated movement list. Anti-aliasing features may also be generated.

The step of generating the movement list includes an initial step of converting a vector-based representation of the object into a bit-mapped representation of the object.

BRIEF DESCRIPTION OF THE DRAWING

The above set forth and other features of the invention are made more apparent in the ensuing Detailed Description of the Invention when read in conjunction with the attached Drawing, wherein:

FIG. 6b depicts the image generated by the three confocal line cameras of FIG. 6a;

DETAILED DESCRIPTION OF THE INVENTION

Figure 1A:
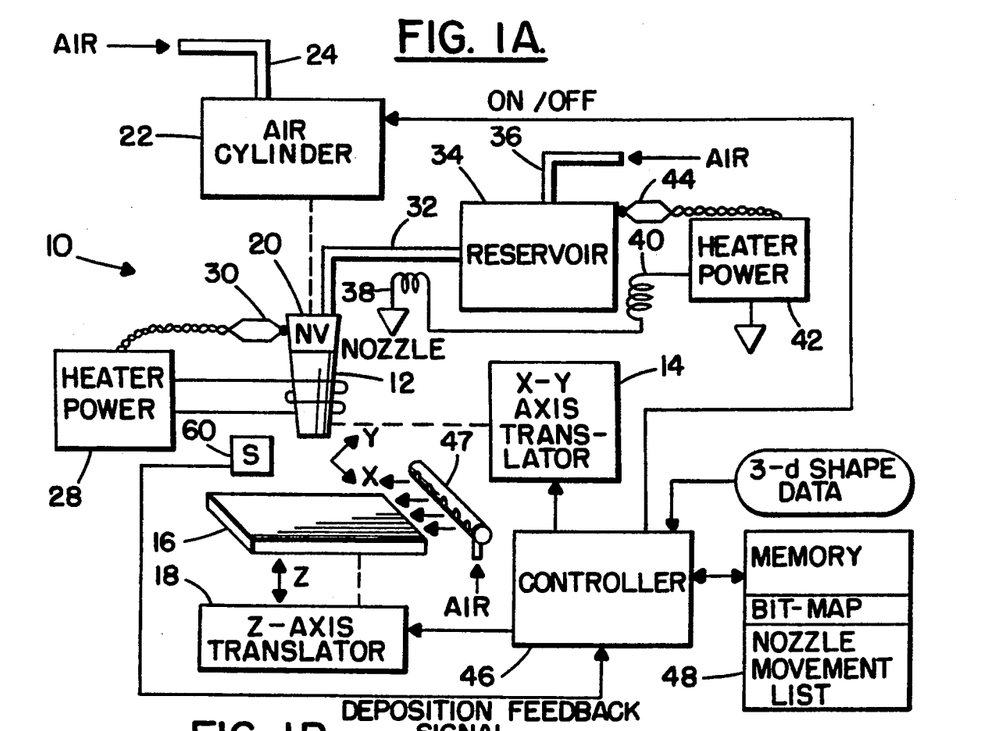
FIG. 1a shows in block diagram form a closed-loop model generation system constructed and operated in accordance with the invention.

Referring to FIG. 1a there is shown a closed-loop model generation system 10 constructed and operated in accordance with the invention. System 10 includes a nozzle 12 that is coupled to an x-y gantry-type translator 14. Through the use of the translator 14 the nozzle 12 is controllably translated within a horizontally disposed x-y plane. Nozzle 12 is disposed over a table 16 that is coupled to a z-axis translator 18. During operation the nozzle 12 is controllably translated in the x-y plane in order to extrude a layer of material. As employed herein extrusion is intended to encompass the controlled flow of a material, an extrudate, through an opening. After extruding a layer of material the z-axis translator is activated to lower the table 16 by an increment equal to the thickness of the extruded material. The nozzle 12 is then again translated in the x-y plane to deposit a next layer directly upon the immediately lower layer.

One suitable x-y translator 14 is manufactured by the Techno Company of New Hyde Park, N.Y. as Model No. HL32SBM2575C. This device has a positioning resolution of 0.0004 inches.

For this embodiment of the invention the nozzle 12 includes a needle valve 20 that is coupled to a bidirectional air cylinder 22. Air cylinder 22 is provided, through a conduit 24, with a source of compressed air at a pressure suitable for activating the needle valve 20, thereby controlling the on/off flow of material through the nozzle 12.

Figure 1B:
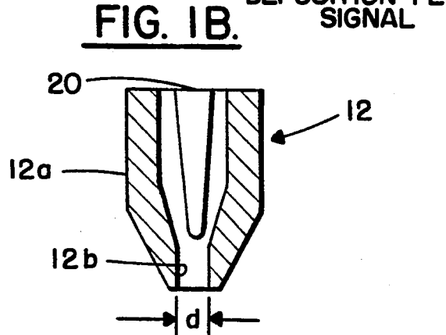
FIG. 1b depicts in cross-section a nozzle having a needle valve installed therein.

FIG. 1b is a cross-sectional view of the nozzle 12 showing in greater detail that the nozzle includes an outer casing 12a, comprised typically of stainless steel, having the needle valve 20 disposed for controllably blocking and unblocking an output orifice 12b. The diameter of the orifice 12b is approximately 0.01 inches, although this dimension may be varied as a function nozzle speed, the nature of the material being extruded, etc. It should be noted that, due to a phenomenon known as "extrudate swell", the final diameter of the extruded material, especially polymer-based materials, may be significantly larger than the orifice 12b opening size.

Other suitable valve types include slider valves and rotating ball valves, both of which are known in the art.

Referring again to FIG. 1a there is also coupled to nozzle 12 a nozzle heater 26 connected to a source of heater power 28. A heat sensing means, such as a thermocouple 30, contacts the nozzle 12 for maintaining the temperature at approximately 450° F. This temperature is a function of the material being extruded and may be higher or lower than 450° F. As will be described in greater detail below, this particular temperature has been found to be suitable for use with a hot melt adhesive material that is a presently preferred material for extruding from the nozzle 12. One hot melt adhesive that has been found to be suitable for use is known as "Thermogrip All Purpose Hot Melt Adhesive", a product distributed by the Black and Decker Corporation.

A conduit 32 is connected to the nozzle 12 and provides for a flow of melted material to be provided to the nozzle 12. This material is held in a heated reservoir 34 that is coupled, via a conduit 36, to a source of compressed air. This source of compressed air typically operates at a pressure of 15-30 psig. Conduit 32 has an associated heater 38 and reservoir 34 has an associated heater 40 both of which are connected to a source of heater power 42. As before, a heat sensing means, such as a thermocouple 44, is provided for maintaining the reservoir within a predetermined range of temperatures. The range of temperatures is a function of the melting point of the selected material.

Coupled to the x-y axis translator 14, the z axis translator 18, and to the needle valve air cylinder 22 is a controller 46. Controller 46 may be embodied in a personal computer data processing system such as an IBM PS/2 system (IBM and PS/2 are both registered trademarks of the International Business Machines Corporation), although any suitable type of data processing system may be employed for the controller 46. Connection to the translators 14 and 18 may be made by any suitable means such as a parallel communication port or a serial communication port. Apparatus and methods for controlling such translators are well known in the art and will not be further discussed herein. Controller 46 has an input for receiving three-dimensional shape data from a CAD system, the use of which will be described in detail below. Controller 46 also has associated therewith a memory 48 for storing data representative of the structure being extruded by the nozzle 12.

Figure 2A:
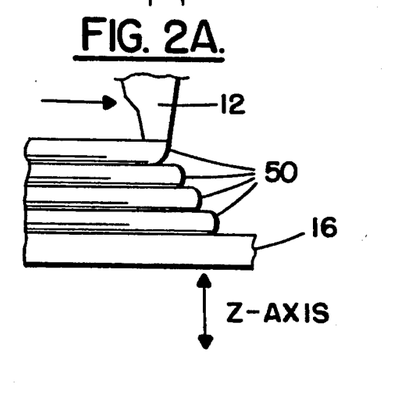
FIG. 2a is an enlarged side view of a partially completed structure showing a plurality of vertically disposed layers that are extruded from a nozzle.

Referring to FIG. 2a there is shown in greater detail the table 16 having a plurality of extruded filaments, or beads 50, disposed thereon. As was previously stated, the lowest bead layer is first deposited, the table 16 is lowered by one bead thickness along the z-axis, and a next bead layer is deposited such that it is attached to the first bead layer. The bead extrusion process is continued layer by layer in the z-direction until the desired part is constructed. Each bead 50 has been found to have a substantially uniform thickness of approximately 0.025 inches when extruded by a nozzle 12 having an orifice opening of 0.01 inches, a nozzle 12 speed of approximately 0.2 inches/sec and a flow rate of approximately 0.1 cm$^3$/min. The larger bead diameter, relative to the nozzle opening, is due to the extrudate swelling phenomenon mentioned earlier.

Figure 2B:
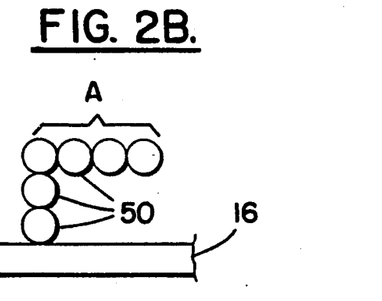
FIG. 2b is an enlarged cross-sectional view of a partially completed structure showing a plurality of vertically and horizontally disposed layers.
Figure 11:
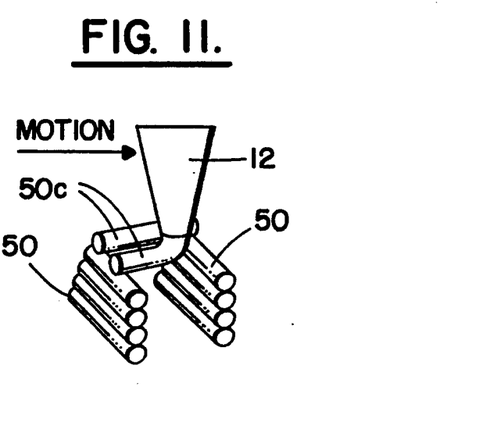
FIG. 11 is an elevational view showing a feature of the invention that provides an unsupported span of extruded material that is attached at each end to previously extruded material.

The use of the hot melt adhesive material facilitates the adhesion of the beads one to another and enables the horizontal placement of unsupported adjacently disposed beads, such as those depicted in cross-section in the region labeled "A" of FIG. 2b. The use of the hot melt adhesive material has also been found to facilitate the placement of unsupported horizontal spans of material, such as the beads 50c of FIG. 11. In FIG. 11 the beads 50c are adhesively attached at each end to previously extruded and hardened material. By example, it has been found that hot melt adhesive material having a bead thickness of approximately 0.025 inches may be spanned in an unsupported manner over a horizontal distance of approximately one inch with a nozzle 12 speed of approximately 0.2 inches/sec and at a flow rate of approximately 0.1 cm$^3$/min. Arcuate spans may also be deposited in similar fashion by translating the the table 16 along the z-axis while simultaneously translating the nozzle 12 in the x-y plane. For a three or more degree of nozzle motion embodiment of the invention movement of the table 16 may be unnecessary to provide an arcuate span of extruded material.

The addition of nozzle motion in three dimensions with respect to the part can create features with desirable characteristics not obtainable with solely two-dimensional deposition. For example, a spiral deposition about a cylindrical structure forms a smooth screw thread without the staircase-like roughness characteristic inherent in solely horizontal deposition.

Figure 3:
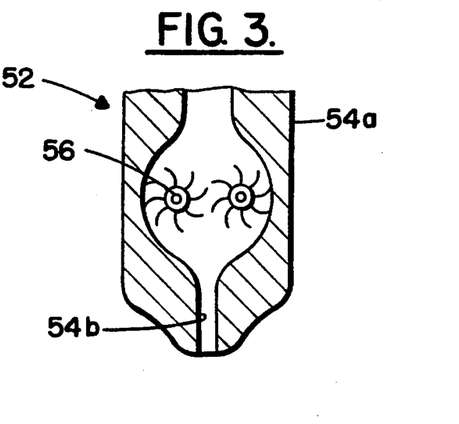
FIG. 3 depicts in cross-section another embodiment of a nozzle having an integral hydraulic pump for controlling the flow of material through the nozzle.

Referring now to FIG. 3 there is shown another embodiment of a nozzle 52. Nozzle 52 is comprised of a body portion 54a, comprised typically of stainless steel, having an outlet orifice 54b. Enclosed within the nozzle 52 is a miniature hydraulic pump 56 that functions, in a manner similar to the needle valve 20 of FIG. 1b, to control the flow of the extruded material through the orifice 54b. One advantage to using the hydraulic pump 56 is that it permits the pressure under which the material is extruded to be increased. An increase in pressure allows for a greater flow rate and, hence, a greater speed of translation of the nozzle 52 may be achieved. The pump 56 may be either electrically or pneumatically actuated. Alternately, the pump may be located external to the nozzle 12 in which case the nozzle 12 may be provided with a suitable valve for turning the flow on and off.

The choice of the extruded material is based on the required mechanical, thermal, cosmetic and/or other specific properties, according to the application of the completed structure. In the case of composite structures, which are structures composed of a number of sub-structures, each sub-structure is made from the material appropriate to the function of that sub-structure. A multi-nozzle system can be employed to build composite structures.

One class of applicable materials melt and flow when heated and bond before and during cooling. These include, but are not limited to, the following: hot melt adhesives, homogeneous mixtures of synthetic polymer, wax, resin and anti-oxidant that possess mechanical, thermal and cosmetic (color, opacity, translucence) properties depending on their formulation. Waxes, including modelling wax and sealing wax, can be employed in the fabrication of investment casting molds and display models. Waxes may also be applied for their dielectric properties, particularly in composite structures. Metallic alloys may be employed to produce functional metal parts and/or structures that are electrically conductive. Glasses may be selected for their optical properties (transmittance, reflectance, refraction) or for their electrical properties. Other thermoplastic or thermoset polymers which flow when heated and bond during cooling may also be employed.

In regard to thermoset materials, it is within the scope of the invention to provide a source of heat external to the nozzle in order to heat the material as it is extruded in order to initiate the curing process. By example, a laser or a radiant lamp having an associated focussing reflector may be coupled to the nozzle and translated therewith for providing a localized source of heating for the extruded thermoset material.

A second class of applicable extrusion materials are adhesives that cure due to exposure to heat, light or other radiation, through chemical reaction, or both. One requirement is that the selected material must cure before losing its extruded shape. Suitable materials include, but are not limited to, the following: epoxy resins, which cure by chemical reaction and applied heat, and silicone adhesives, which cure by reaction with water.

A third class of materials are heterogeneous mixtures of one of the above materials with another, dissimilar material. Examples include, but are not limited to, the following. Thin plastic, metal, glass or other fibers may be extruded as part of a bead of a dissimilar material described above to act as reinforcing elements for greater mechanical rigidity. Electrically conductive fibers or particles may be extruded with a non-conductive material to form a conductive bead. By example, in this manner electrical wiring can be embedded within a non-conductive plastic housing. Rock dust may be mixed with epoxy, as in the commercially available Granitan (a mixture of granite powder and epoxy) to fabricate rock-like structure or sculptures.

As can be appreciated, for certain of the extrusion materials listed above the various heaters shown in FIG. 1a may be eliminated all together. Also, for those materials that are heated during or after extrusion a local source of air or some other gas has been found to speed cooling of the material. By example, a duct 47 having a plurality of openings is coupled to a source of air and is disposed such that it provides a substantially uniform flow of cooling air to the plane wherein extrusion is occurring.

Further in accordance with the invention, and referring once more to FIG. 1a, the system 10 may include a deposition feedback system comprised of a feedback sensor 60 that operates near the tip of the nozzle 12 and which provides a feedback signal to the controller 46. This feedback signal is indicative of a characteristic of the extruded bead 50. More specifically, the feedback sensor 60 detects a position or other characteristic of a most recently extruded portion of the material. By example, the sensor 60 may detect the position of the extruded bead 50 relative to a positional reference system, the bead position being monitored by the controller 46 so as to make adjustments, if required, to the nozzle 12 position during extrusion. This technique advantageously permits a finer control over the geometry of the extruded structure and results in a structure that more closely approaches that defined by the three-dimensional shape data. The feedback signal, depending upon the particular type of sensor 60 that is employed, may also provide other information, such as a temperature of the extruded bead or a dielectric characteristic thereof.

The feedback provided by the sensor 60 is important in that a number of different mechanisms may operate that result in the extruded material having dimensions other than those intended. For example, when the extruded bead is applied around a convex or a concave contour the bead, while still hot enough to be pliable, tends to distort to minimize its length. Also, and depending on the distance from the nozzle to the underlying material, the extruded bead may change its deposited cross-section as a function of this distance. Also, it has been found that back pressure from already deposited material that is near the nozzle may reduce the flow rate out of the nozzle. Also, changes in temperature or composition of the material to be extruded may change the rate at which the material flows out of the nozzle and, as a result, the rate at which the material solidifies to its final dimension.

One disadvantage of systems of the prior art is that these and other factors that influence the final dimensions of the part are not adequately compensated for, if at all, resulting in a less than optimum control of part fabrication and dimensions.

However, this aspect of the invention minimizes the effects of these various mechanisms by providing deposition feedback. For example, if a software error were to cause the nozzle to drive into the deposited material or into the table 16 the feedback signal indicates this error condition. Also, if the nozzle is driven to extrude a span or arch of material through a region that is unsupported by underlying material, the feedback sensor may indicate that the extruded bead is drooping past a predetermined tolerance and, thus, that an error condition exists.

The feedback sensor 60 may be embodied by a number of different devices that are either fixed to the frame of the system or which are translated with the nozzle 12. In general, the feedback sensor 60 may be embodied within imaging devices or within proximity sensing devices. In either case, the sensors function to provide information regarding the most recently extruded material. More specifically, suitable sensors include, but are not limited to, visible imaging devices, infrared emission imaging devices, capacitive detection devices, tactile detection devices, and pneumatic detection devices. These various means for providing the deposition feedback signal are described in greater detail below.

In that the material being extruded may flow after extrusion, a knowledge of the nozzle position does not necessarily indicate the final position of the extruded bead 50. A first technique to determine an actual deposited position of the bead 50 is to image the bead with an optical system. The optical deposition feedback signal may be generated with split diode pairs, quadrants, position sensing diodes, CCD arrays, or vidicons.

Figure 4A:
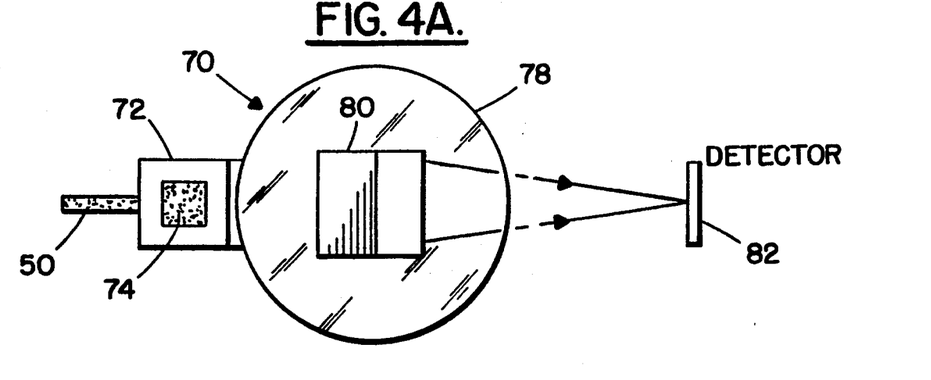
FIG. 4a is a top view and FIG. 4b is a side view of one embodiment of a visual feedback system that employs a Cassegrain optical configuration.
Figure 4B:
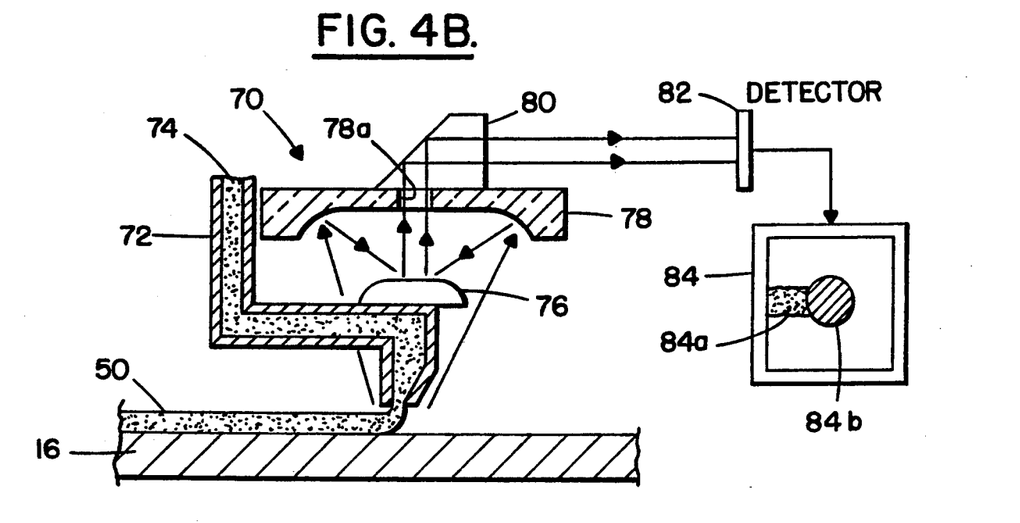

FIGS. 4a and 4b illustrate a top view and a side view, respectively, of a Cassegrain optical system 70. For this embodiment a nozzle 72, having material 74 passing therethrough, is provided with a shape for supporting optical elements. Specifically, a convex element 76 is positioned relative to a concave element 78 for forming a Cassegrain configuration. In operation light reflecting from the region of the extruded material is reflected first by the concave element 78 to the surface of the convex element 76. This light is then reflected up through an aperture 78a within the element 78. Disposed above the aperture 78a is a 90° prism 80 that directs the image to a detector 82, such as a CCD detector array. The output of the detector 82 is provided to a frame grabber or similar image storage means for subsequent processing by a dedicated image processor or by the controller 46 itself. If provided to a display 84 the resulting displayed image shows a bead image 84a and a centrally disposed obscured center 84b. The size of the obscured center region 84b corresponds to the diameter of the element 76. By detecting the position of the bead image 84a through the use of conventional image processing techniques, such as edge detection, the controller 46 is enabled to determine if the bead is positioned at the correct location as specified by the three-dimensional shape data.

Figure 5:
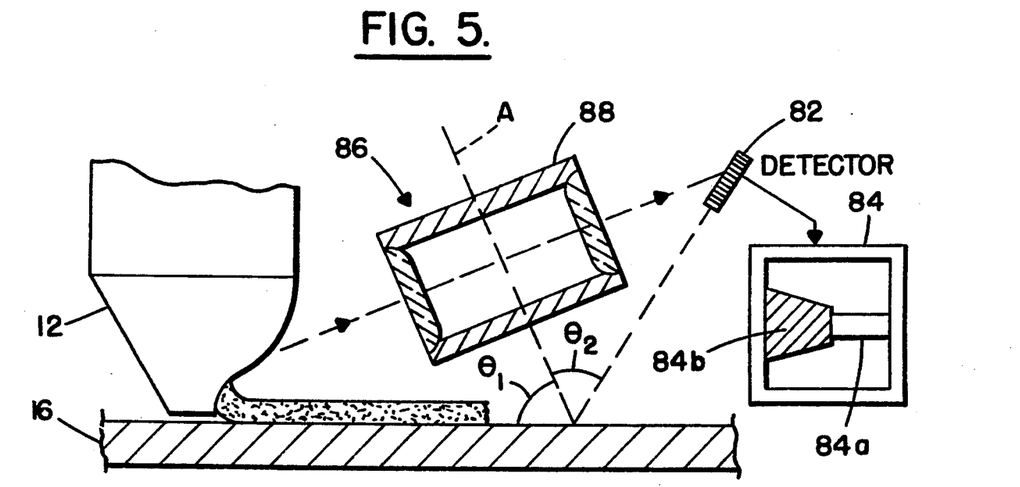
FIG. 5 is a side view showing another embodiment of a visual feedback system that employs non-parallel image and object planes using an optical system.

FIG. 5 depicts another embodiment of the visual image feedback sensor 60. The embodiment of FIG. 5 employs non-parallel image and object planes using an optical system 86. Preferably, an a focal lens 88 is positioned for viewing the nozzle tip, a plane of symmetry of lens 88 being disposed at an angle $\theta_1$ with regard to the plane of the table 16. The imaging surface of the detector 82 is disposed at an angle $\theta_2$ to the plane of symmetry A, wherein $\theta_1$ equals $\theta_2$, and thus sees the bead image in focus. The resulting image, if displayed by a display 84, shows the bead image 84a. This image data is input to the controller 46 for image processing to determine if the position of the bead image 84a corresponds to the desired position.

Figure 6A:
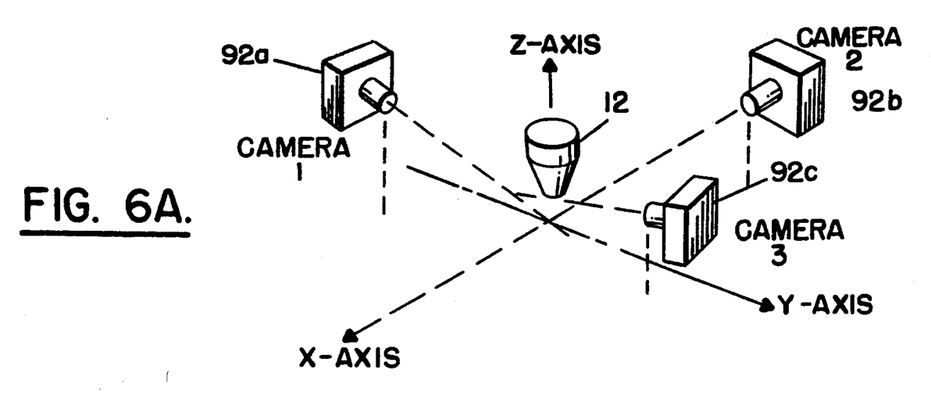
FIG. 6a is a further embodiment of a visual feedback system employing three confocal line cameras for imaging a region near the nozzle.
Figure 6B:
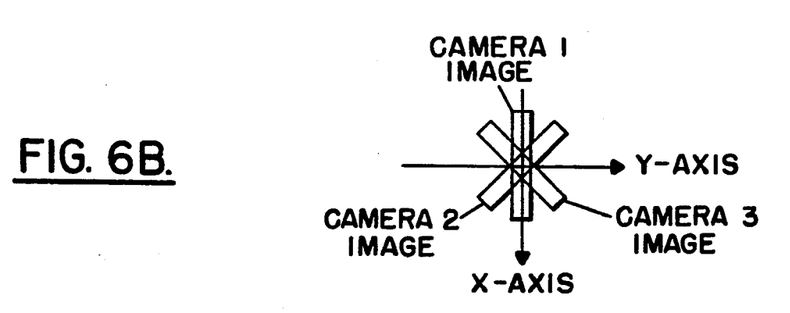

Referring now to FIG. 6a there is shown a further embodiment of the visual image deposition feedback sensor 60. A confocal line camera system 90 includes a plurality of confocal line cameras 92a, 92b, and 92c each of which is disposed at a predetermined elevation above the table 16. Confocal cameras are a known type of optical device employing a line source of illumination in combination with a plurality of slit apertures and a line detector. FIG. 6b illustrates a superposition of the three confocal line camera outputs to give a depth,resolved image of the region adjacent to the nozzle. Each camera images the deposited bead and, when superimposed as depicted in FIG. 6b, the three linear bead images intersect the x-axis and y-axis origin, referenced to the nozzle 12 tip. The cameras 92a–92c are typically mounted so as to move with the nozzle 12 so that if a bead is mispositioned the bead image will not appear where expected. This condition is detected by the controller 46 which thereafter may take corrective action.

The depth-resolved confocal camera technique is especially useful if there is a possibility that the image detectors will respond to signals from underlying, previously deposited beads. This condition may also be remedied by employing light section and reduced depth of focus techniques. As an example of a light section approach a plurality of laser diodes are employed to generate a sheet of light having a thickness corresponding to that of the deposited bead and a width corresponding to the field of the view of the imaging objective. The sheet of light is preferably sourced from one or both ends of the x-y gantry structure 14 that supports the nozzle 12. In this manner, only the material of the bead being deposited is illuminated and is therefore imaged.

Other suitable methods for providing the deposition feedback signal are now described.

One method employs infrared radiation emission imaging using, for example, a cooled mercury cadmium telluride imaging array. An advantage of this technique is that only the most recently, and thus hottest, deposited material is imaged from its infrared emission, thereby providing for the automatic rejection of previously extruded material. Additional benefits of this approach are a direct indication of bead temperature and an indication if insufficient heat dissipation is causing the deposited bead to distort in shape.

Figure 10A:
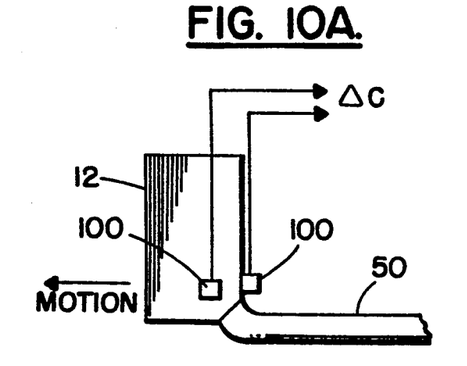
FIGS. 10a–10c depict three non-optical feedback sensors including, in FIG. 10a, a capacitance proximity detector, in FIG. 10b a tactile proximity sensor, and in FIG. 10c a pneumatic proximity sensor.

Several non-optical, proximity-type feedback techniques may also be employed for detecting the position of the extruded bead 50. A first non-optical technique is depicted in FIG. 10a and relies on a dielectric constant of the deposited material being different than that of air. For this embodiment an array of capacitive probes 100 are positioned adjacent to the nozzle opening. The probes detect the proximity and position of the extruded material through a change in capacitance and, therefore, a detectable change occurs in an electrical signal passing through the capacitance. An advantage of this technique is that the rapid fall-off of the capacitive change with distance automatically provides rejection of material from underlying, previously deposited bead layers.

Figure 10B:
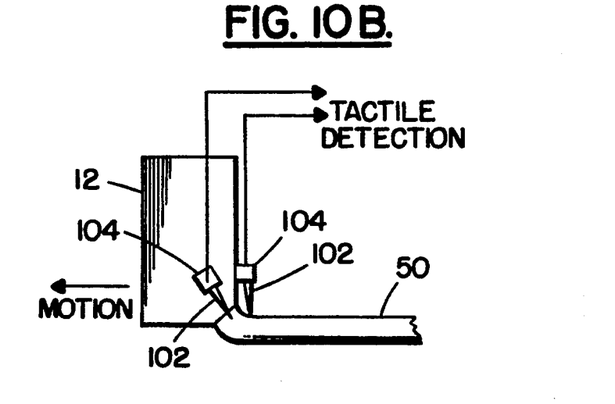

A second non-optical technique is depicted in FIG. 10b and is a variant of a high precision mechanical metrology measurement technique of the type that involves pushing a sapphire ball towards a surface and accurately recording the position of the ball when the ball contacts the surface. This tactile technique is employed to advantage by the invention in that the extruded material may be touched as soon as it cools or cures and hardens. A wire 102 or other object mounted to a deflection detector 104, such as a piezoelectric sensor, is attached to the nozzle 12 to determine the position of surfaces of a recently deposited bead. In that the nozzle 12 is already within a precisely defined coordinate system the position of the contacted surfaces can be deduced, when deflection occurs, from the nozzle 12 position and from the dimension of the wire 102 or other object that is contacting the extruded material.

Figure 10C:
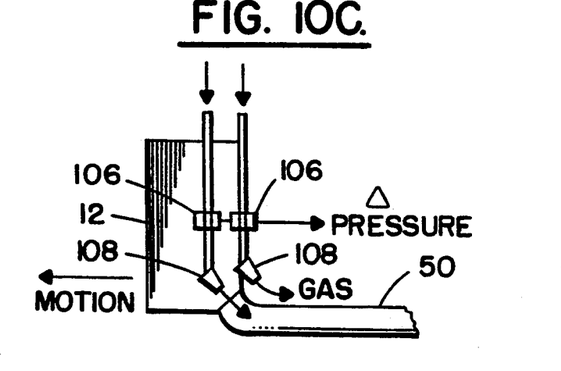

A further non-optical technique is depicted in FIG. 10c and relies on pneumatic detection of bead 50 position. For this embodiment an array of air gauge sensors 106 are disposed about the nozzle tip to provide the required dimensional feedback information. A gas, such as compressed air, is exhausted from orifices 108 disposed about the nozzle tip. When the deposited material is closely adjacent to one of the gas exhaust orifices 108 a back pressure into the orifice 108 is developed. The presence of a back pressure indicates the presence of the material while the magnitude of the back pressure indicates the distance from the affected orifice 108 to the deposited material. This particular type of feedback sensor 60 has the advantage of the capacitive probes 100 described previously in that automatic rejection of previously deposited, underlying beads occurs. An additional advantage resulting from the use of this technique is that the gas jets serve to cool the deposited material.

It is also within the scope of the invention to provide several deposition feedback sensors for simultaneously monitoring the deposited bead 50. By example, one of the visual sensing techniques may be used in combination with IR emission detection and/or with pneumatic detection. This combination provides redundant bead position detection while also simultaneously providing for extruded bead temperature detection and/or cooling.

A further feedback sensor, employed either alone or in combination with those already described, involves a pressure gauge to measure the pressure of the material being extruded through the nozzle 12. An increase in pressure may indicate an "over-write" condition wherein the nozzle tip is contacting already extruded material, thereby generating a back pressure due to a constriction in flow.

Figure 7:
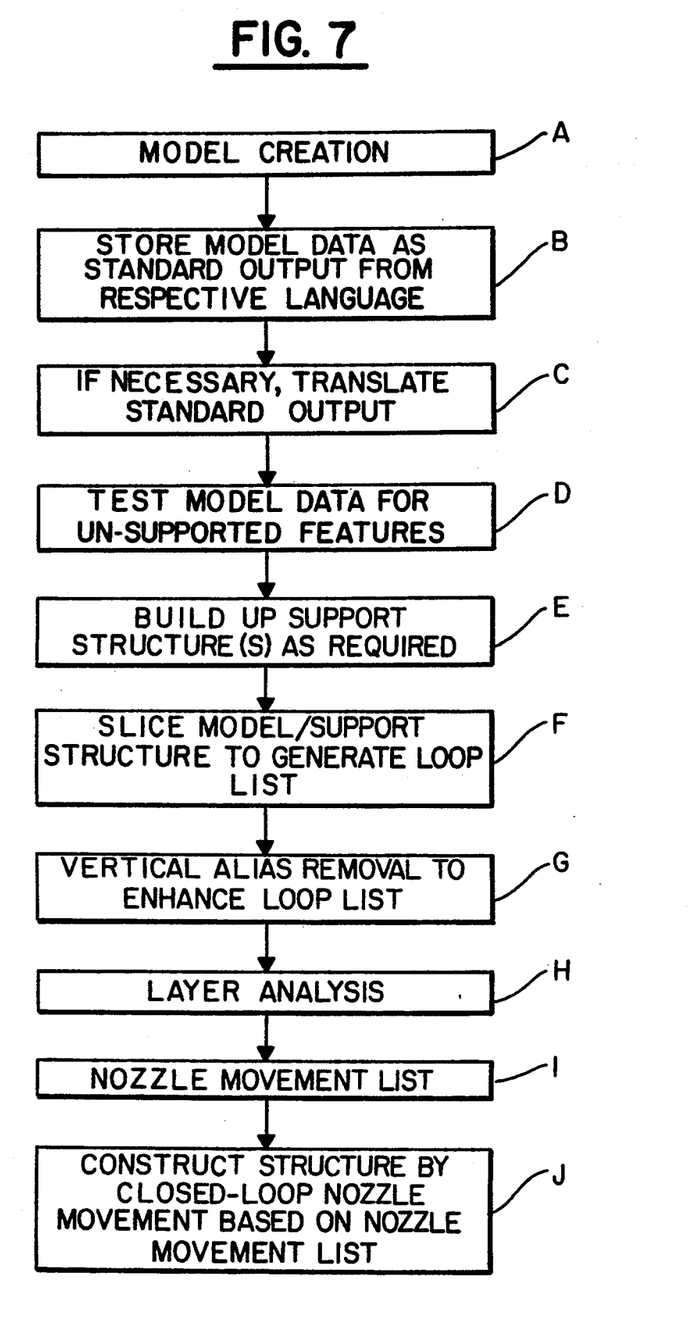
FIG. 7 is a process flow diagram showing steps that are executed in order to construct a structure with the closed-loop extrusion nozzle system of the invention.

Referring now to the process flow diagram of FIG. 7 there is described the operation of the system 10. A first step (A) involves model creation using any of a number of existing software packages such as AutoCad, Computer-Graphics Aided Three-Dimensional Interactive Application (CATIA) or Pro/Engineer (a product of Parametric Technology Corporation). The step of model creation creates a data model of the desired three dimensional structure. The model data is stored (B) in a standard output form for the respective software package, such as in an Initial Graphical Exchange Specification (IGES) format, .STL format, or a CATIA representation. If necessary, the data is also passed through a translator (C) to obtain a format used by the subsequent processing routines. As an example, a translator is available from the International Business Machines Corporation (PRPQ P81040 Solids to Prototype) to convert CATIA to the .STL format. In general, such translators are known software modules that are readily available.

In this regard, three dimensional data storage and processing is conventionally done in a vector rather than in a bit mapped format. A primary reason for the use of the vector approach is an efficient use of system memory. For example, 10 mil resolution across a structure that is 10 inches on a side represents minimally one gigabit ($10^9$) of bit mapped data. Furthermore, additional information such as whether a particular element is a surface feature, whether the element is an added support structure, element color and composition, may result in significantly more data storage being required. While vector processing allows a significant reduction in storage area, relative to the bit mapped approach, it may also result in a significant ambiguity in structural definition. For example, some translation programs are known to fail to generate a consistent representation a few percent of the time.

Although requiring more system memory than the vector representation, the bit-mapped representation of the CAD data has several advantages over the vector approach.

A first advantage is an automatic intersection of overlapping objects. Unlike stereolithography, during the use of the extrusion technique of the invention it is not generally desirable to "write" multiple times at the same location. This is especially true for a visible surface as opposed to an internal structural supporting member. If such were to occur interference with the already deposited bead would occur. If, for example, a particular layer of the structure is composed of two over-lapping filled circles, it is necessary to recognize that the overlap region should not be filled twice, and that the perimeter does not pass through the center of an adjacent object.

Another advantage of the bit-mapped representation is an automatic maintenance of a uniform level of precision. A common problem in the output from many conventional CAD software packages relates to the unintentional generation of relatively small floating point features. The existence of a uniform grid employed for the bit-mapped representation allows such features to be discarded.

A further advantage of the bit-mapped representation relates to region identification. There are a number of characteristics of extrusion deposition that are region sensitive. One example is that a span in free space between two supports may only have a certain maximum length. Similarly, an unsupported ledge extending from a vertical feature may only extend into free space a certain maximum distance. A further example concerns a tendency of a material that is deposited within a confined region to accumulate heat. These considerations are problematic for the bit-mapped approach, but are extremely difficult to recognize and consider with the vector approach.

Also, and to the extent that memory is available, there is an advantage in using a finer coordinate grid than the width of the extruded bead. This allows for interpolation, facilitates an elimination of sub-bead-sized objects, and allows for a finer mechanical resolution than that dictated by the width of the extruded bead.

Returning to the process flow diagram of FIG. 7 at step (D), the model data is tested for the presence of un-supported features. Un-supported features are considered to be model structural features that may fail or collapse because of a lack of underlying supporting structure. A step (E) builds up supporting structure or structures as required. Steps (D) and (E) are described in further detail below in relation to FIGS. 8a-8d.

A next step (F) slices the combination model/support structure to generate a loop list. For this step the objects' intersection with a series of evenly spaced horizontal planes is stored as a series of perimeter loops on each plane following a predetermined rule. The predetermined rule, such as a left-hand rule, determines which side of the loop is filled and which is empty.

Figure 12:
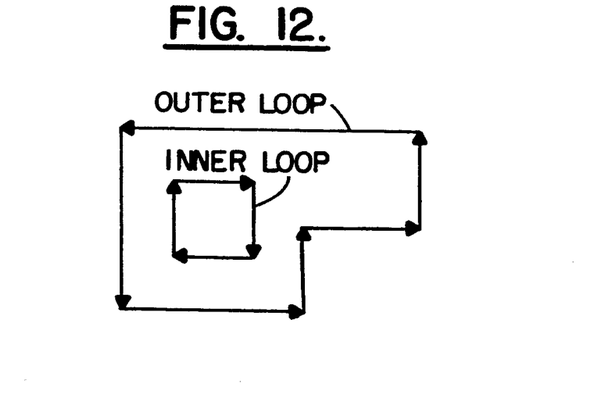
FIG. 12 depicts a "left-hand" rule that is a feature of information passed from an object layer slicing routine to a nozzle movement list generator.

Referring to FIG. 12 there is shown an object plane that is bounded by an outer loop and by an inner loop. The interior of the object plane is typically raster-filled with material during extrusion. One or more of the perimeter beads are then extruded to provide a smooth, finished edge. In accordance with a left-hand rule the loop edges are described so that the material side of the loop edge is on the left; that is, counter-clockwise for the outside loop and clockwise for the inside loop. A right-hand rule convention would reverse the sense of the location of the material side of the loop.

It should be noted that this loop list convention is adapted for data transferred from an object slicing routine to a nozzle movement list generator. The actual nozzle motions during fabrication may or may not coincide with the sense and the direction expressed by the loop list convention in effect.

The loop list is employed for object planes that are spaced a bead thickness apart. For the illustrated embodiment of FIG. 1 the bead planes are spaced approximately 25 thousandths of an inch apart, a dimension corresponding to the final diameter of the extruded bead 50.

Figure 9A:
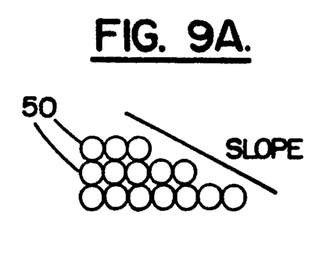
FIGS. 9a–9c depict in cross-section an aliased edge portion of a structure, a first method for anti-aliasing the edge, and a second method for anti-aliasing the edge, respectively.
Figure 9B:
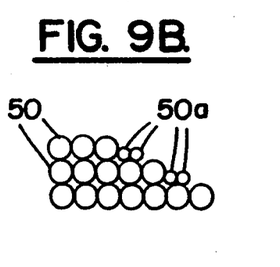

A next step (G) performs a vertical alias removal technique in order to enhance the already generated loop list. This vertical alias removal is employed for surfaces having a vertical slope that results in an undesirable staircase effect, as illustrated in FIG. 9a. FIG. 9b illustrates one method of reducing this undesirable staircase effect by adding loops of beads 50a at z-heights other than that employed for the beads 50. These smaller beads 50a are employed to smooth the staircase edge of the part. The use of the smaller diameter beads 50a may involve a change in nozzles during the fabrication of each associated layer. Alternately, the smaller beads 50a may be added to the model after completion of the extrusion of all of the layers employing the larger beads 50.

Figure 9C:
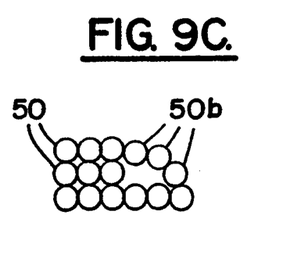

FIG. 9c illustrates another method of removing the undesirable staircase effect. This method is especially applicable to the hot melt adhesive that is a presently preferred extrusion material. Relying on the adhesive property of the extruded material a plurality of beads 50b are added to the structure in order to bridge a lower layer to an upper layer. Due to control of the z-axis translation stage 18 the bridging beads 50b may be added after the fabrication of the required structural layers.

This ability to revisit previously extruded layers is an especially valuable feature of the invention that is not generally available in certain of the prior art deposition techniques, such as stereolithography. This technique permits structures of arbitrarily complex shapes and surface finish to be fabricated. For example, screw threads may be readily added to an already completed circular cylindrical structure.

It should be noted that the step of vertical alias removal is optional and may not be required for certain parts, such as parts generated as a gross check of three-dimensional CAD data.

A next step (H) of the process method performs a layer by layer analysis of the structure. For a given layer of the structure an order by which the constituent regions are filled with material is determined by considering in turn several prioritized rules.

A rule having a highest priority is that the deposited material must be supported by adjoining or by underlying material. In general, the object cannot be constructed if this rule is violated. A rule of lower priority is that exterior surfaces be formed by beads deposited locally parallel to any surfaces in immediate contact therewith to insure a maximum smoothness of the exterior surface. A rule of still lower priority is that the flow of material from the nozzle should be started or stopped infrequently. This rule is provided to eliminate structural artifacts created by starting and stopping the flow from the nozzle. A rule of lowest priority is that the nozzle coordinates are chosen so that the outer surface of the bead and the calculated position of the associated loop coincide so as to ensure an accurate placement of the outer bead surface.

Having performed the layer by layer analysis the nozzle movement data list (I) for each layer or slice of the structure is generated. This nozzle movement list is stored within the memory 48 and is employed by the controller 46 as the structure is built up on the table 16. The nozzle movement list is employed by the controller 46 to provide controlling outputs to the x-y translator 14 between movements of the z-axis translator 18.

The fabrication of the three dimensional structure based on the nozzle movement list (J) is a final step of the process. This final step typically involves the controller 46 monitoring the deposition feedback signal generated by the feedback sensor 60 to ensure that the deposited bead position corresponds to the position specified in the nozzle movement list.

A further description of the operation of steps D and E referred to above is now provided.

For a particular structural orientation there is some point, line, or surface having a highest altitude. An area within this top layer that does not have a structure that will support it in the preceding layer, and that is too far from supports for bridging to succeed, requires that additional structure or structures be added in the preceding layers. These additional structures are propagated down through all other layers until they either terminate in other portions of the original object or until the bottom layer is reached.

Starting at the top layer, calculation proceeds through the entire object, creating vector descriptions of the required support structures as it proceeds and appending the vector descriptions to the original part description. When this first pass through the part is completed the subsequent steps of slicing the composite structure and creating the nozzle movement begins.

After conversion to the bit mapped representation, and starting with the bottom layer, all solid-filled areas that are one or two bead's thickness from the perimeter(s) are raster filled, followed by smooth application of the perimeter(s). The subsequent layers are recursively converted into nozzle movement lists in the same manner, with the restriction that raster filled regions are first filled over areas supported by a previous layer, and are then filled by enlarging these areas and bridging the un-supported areas. An advantage to this approach is that a maximum amount of bit mapped volume that the processor must span is the equivalent of a layer having a thickness of two beads. As a result, system memory requirements are reduced in that only a relatively small portion of the bit mapped data is maintained within the processor at any given time.

In regard to translating the vector description; to the bit mapped description the vector data may be translated by any suitable technique. One well known technique is known as the Bresenham algorithm. Each quantum or pixel of bit mapped data may include from one to some arbitrarily large number of bits. A single bit corresponds to a nozzle on/off condition indicating the presence or absence of extruded material. Preferably, however, some larger number of bits are employed for specifying such parameters as nozzle size, nozzle opening shape, material color, material selection for composite structures, timing bits for controlling material cooling times, etc.

Figure 8A:
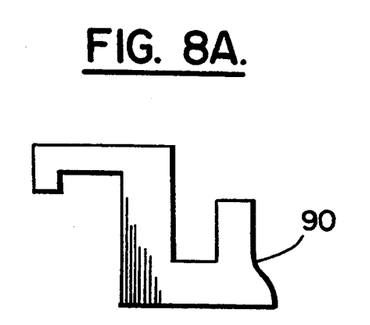
FIGS. 8a–8d depict the operation of the steps D and E of FIG. 7 in testing CAD model data for unsupported features and for building up support structures as required.

Referring to FIG. 8a there is shown a cross sectional view of a portion of a three-dimensional structure 90. It should be realized that the structure 90 is represented at this stage by a vector representation data file obtained from the step A of model creation. In accordance with this aspect of the invention un-supported features, that arise from the bottom-up construction technique, are detected by a "region of support" algorithm.

Figure 8B:
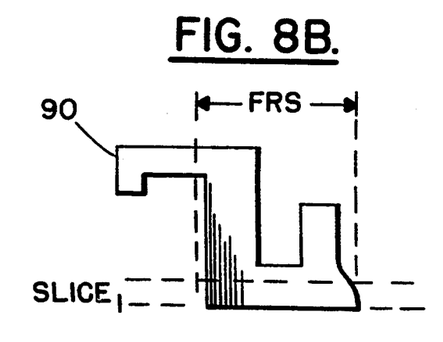
Figure 8C:
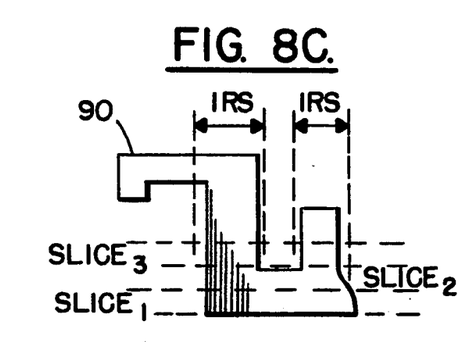
Figure 8D:
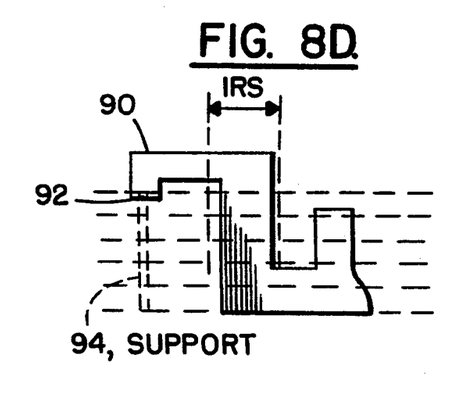

For this algorithm a region of support is generated for each slice of the object to determine areas of support for a next vertically disposed slice. For any slice, regions which are both disconnected and do not fall within an existing region of support are determined to be "un-supported". Referring to FIG. 8b a first slice of the object 90 yields a First Region of Support (FRS) as shown. FIG. 8c illustrates the operation of region of support algorithm after several more slices have been analyzed. At this stage of the analysis the structure is defined by two Intermediate Regions of Support (IRS) as shown. Thus far in the analysis, the portions of the structure lying within the slices have all been determined to be supported by underlying structures. When the analysis proceeds to the stage depicted in FIG. 8d an un-supported feature 92 is detected. Region 92 is detected in that it does not lie within the area bounded by the current IRS. As a result, a support structure 94 is generated in a manner such that the region 92 is supported from the first slice up through all intervening slices. The generation of the support structure 94 involves propagating the support structure downwards through the previously analyzed slices. In that no portion of the original structure underlies the unsupported region the support structure 94 is propagated downwards to the first layer and thus terminates upon the table 16. Subsequently, at step (F), when the composite model/support structure is sliced to generate the loop list, the list incorporates the required loops to also form the support structure 94. The support structure list may also be stored and maintained in a separate file to specifically identify support structures and to guide the subsequent removal of same.

The foregoing support analysis may include known types of cantilever and center of gravity calculations in order to determine unsupported regions. These considerations may be important in that, depending upon the properties of the material selected for extrusion, such as adhesion between adjacent beads, some degree of horizontal feature extension may be tolerated without requiring an underlying support. See, for example, FIGS. 2b and 9c.

This structural analysis also preferably involves, if appropriate, heat capacity considerations based on the properties of the selected extrusion material. One example of where heat capacity considerations are important is as follows. If the structure to be fabricated has the shape of a hollow cylinder with a closed-off tip the diameter of the cylinder may be sufficiently small so that the extruded material may bridge the closed-off end without requiring underlying supports. The cylindrical wall is built up as a sequence of rings. Applying the previously defined rules a disk-like feature required to close-off the end is made as a spiral from the perimeter of the uppermost layer of the cylinder wall to the center. If there is no compensation for the amount of time that the extruded material requires to cool, the center of the disk may sag in that the smaller inner rings of the spiral may not have an opportunity to sufficiently cool before they are required to serve as lateral supports for the smaller, inwardly disposed rings.

There are several suitable compensation techniques to accommodate an identified localized hot-spot. A simplest, and most memory intensive, technique adds n clock bits to the description of each three dimensional bit-mapped data point. During deposition all of the clock bits are periodically decremented until they equal zero. The controller 46 monitors the state of the clock bits and delays extruding new material adjacent to existing material until the clock bits for the adjacent material are decremented to zero. The effect during deposition of the disk-like feature is that the nozzle 12 velocity varies proportionally to the radius as measured to the center of the feature.

A more complex, but less memory intensive, technique maintains in a software ring buffer the last n nozzle movements. A requirement that must be fulfilled before new material is extruded is that the new material cannot be extruded adjacent to material extruded within the last n nozzle movements.

For both of these techniques the value of n is a function of the temperature of the extruded material, the heat capacity of the extruded material, the provision of and capacity of the localized cooling duct 47, etc.

Further in accordance with the invention the data derived from the deposition feedback signal may be employed to generate a bit-mapped representation of a previously deposited layer. Nozzle movement coordinates required to deposit an overlying layer are thus referenced to the bit mapped coordinates of the underlying layer, as deposited. This technique provides for both real-time compensation of dimensional tolerance errors and reduces an amount of memory required to store the three dimensional bit-mapped structural representation.

Although described in the context of specific embodiments it should be appreciated that a number of modifications may occur to those having skill in the art. For example, although the use of the bit-mapped representation of the three dimensional structure is presently preferred, the teaching of the invention also applies to vector-based structural representations. Also, it should be realized that the functions of CAD definition and the subsequent generation of the nozzle movement lists may be accomplished with a single data processor, such as the controller 46, or by a plurality of data processors. For this latter case only the nozzle movement lists may be required to be downloaded and stored within the memory 48. Similarly, for visual deposition feedback the controller 46 may perform the required image analysis, or this function may be performed by a dedicated image processor installed within or separate from the controller 46.

Also, a number of variations of the support generation step may be employed. For example, a two pass technique may be used, as described, for first slicing the structure to identify required supports, followed by a second slicing operation to define the layers of the composite model/support structure. Support generation may also be accomplished with the single combined layer definition and support analysis technique. If a support is found to be required the support is added and then propagated downwards through previously defined layers.

Furthermore, it should be appreciated that aspects of the invention relating to closed loop operation and processing of the object definition to add support structures, perform anti-aliasing and the like are applicable to other than extrusion-based fabrication systems. That is, other fabrication tools associated with stereolithography and sintering fabrication systems, by example, may also benefit from the application of these teachings.

Thus, while the invention has been particularly shown and described with respect to a number of embodiments thereof, it will be understood by those skilled in the art that changes in form and details may be made therein without departing from the scope and spirit of the invention.

Having thus described our invention, what we claim as new, and desire to secure by Letters Patent is:

1. A method for fabricating a three-dimensional object in accordance with a computer-generated definition of the object stored within a memory means, comprising the steps of:

evaluating the stored definition of the object to locate any un-supported features of the object;

in response to locating an un-supported feature, defining a support structure for the un-supported feature;

generating a fabrication tool movement list expressive of movements required by a fabrication tool to fabricate the object and any defined support structures; and translating the fabrication tool in accordance with the generated fabrication tool movement list to fabricate the object and any defined support structures; wherein the step of translating includes the steps of, generating a feedback signal that is indicative of at least one characteristic of a most recently fabricated portion of the object; and monitoring the feedback signal to detect a deviation of at least a location of the most recently fabricated portion of the object from a corresponding location as expressed in the associated portion of the fabrication tool movement list.

2. A method as set forth in claim 1 wherein the step of evaluating includes a step of slicing the definition of the object into a plurality of vertically stacked planes.

3. A method for fabricating a three-dimensional object in accordance with a computer-generated definition of the object stored within a memory means, comprising the steps of:

evaluating the stored definition of the object to locate any un-supported features of the object;

in response to locating an un-supported feature, defining a support structure for the un-supported feature;

generating a fabrication tool movement list expressive of movements required by a fabrication tool to fabricate the object and any defined support structures; and translating the fabrication tool in accordance with the generated fabrication tool movement list to fabricate the object and any defined support structures; wherein the definition is stored as a plurality of vectors representing the object.

4. A method as set forth in claim 3 wherein at least the steps of evaluating and defining are performed using the stored plurality of vectors.

5. A method as set forth in claim 4 wherein the step of generating the fabrication tool movement list includes an initial step of converting the plurality of stored vectors to a bit-mapped representation of the object.

6. A method for fabricating a three-dimensional object in accordance with a computer-generated definition of the object stored within a memory means, comprising the steps of:

evaluating the stored definition of the object to locate any un-supported features of the object;

in response to locating an un-supported feature, defining a support structure for the un-supported feature;

generating a fabrication tool movement list expressive of movements required by a fabrication tool to fabricate the object and any defined support structures; and translating the fabrication tool in accordance with the generated fabrication tool movement list to fabricate the object and any defined support structures; wherein the step of generating the fabrication tool movement list includes an initial step of analyzing the definition of the object to identify alias features associated with a periphery of the object.

7. A method as set forth in claim 6 wherein the step of analyzing includes a step of adding additional features to the definition of the object to reduce a magnitude of identified alias features.

8. A method for fabricating a three-dimensional object in accordance with a computer-generated definition of the object stored within a memory means, comprising the steps of:

evaluating the stored definition of the object to locate any un-supported features of the object;

in response to locating an un-supported feature, defining a support structure for the un-supported feature;

generating a fabrication tool movement list expressive of movements required by a fabrication tool to fabricate the object and any defined support structures; and translating the fabrication tool in accordance with the generated fabrication tool movement list to fabricate the object and any defined support structures; wherein the step of generating the movement list includes a step of analyzing the definition of the object to identify regions of the object having a potential to retain heat during the step of translating.

9. A method as set forth in claim 8 wherein the step of analyzing includes a step of modifying the fabrication tool movement list to compensate for a retention of heat by the identified regions.

10. A method for fabricating a three-dimensional object in accordance with a computer-generated definition of the object stored within a memory means, comprising the steps of:

evaluating the stored definition of the object to locate any un-supported features of the object;

in response to locating an un-supported feature, defining a support structure for the un-supported feature;

generating a fabrication tool movement list expressive of movements required by a fabrication tool to fabricate the object and any defined support structures; and translating the fabrication tool in accordance with the generated fabrication tool movement list to fabricate the object and any defined support structures; wherein the step of translating includes the steps of:

generating a feedback signal that is indicative of at least one characteristic of a most recently fabricated portion of the object;

monitoring the feedback signal to detect a deviation of at least a location of the most recently fabricated portion of the object from the corresponding location as expressed in an associated portion of the fabrication tool movement list; and modifying a subsequent portion of the fabrication tool movement list to compensate for a detected deviation.

11. Apparatus for fabricating a three-dimensional object in accordance with a computer-generated definition of the object stored within a memory means, comprising:

means for evaluating the stored definition of the object to locate any un-supported features of the object;

means, responsive to the evaluating means locating an un-supported feature, for defining a support structure for the un-supported feature;

means for generating a fabrication tool movement list expressive of movements required by a fabrication tool to fabricate the object and any defined support structures; and means for translating the fabrication tool in accordance with the generated fabrication tool movement list to fabricate the object and any defined support structures; wherein the translating means comprises, means for generating a feedback signal that is indicative of at least one characteristic of a most recently fabricated portion of the object;

means for monitoring the feedback signal to detect a deviation of at least a location of the most recently fabricated portion of the object from the corresponding location as expressed in an associated portion of the fabrication tool movement list; and means for modifying a subsequent portion of the fabrication tool movement list to compensate for a detected deviation.

12. Apparatus for fabricating a three-dimensional object in accordance with a computer-generated definition of the object stored within a memory means, comprising:

means for evaluating the stored definition of the object to locate any un-supported features of the object;

means, responsive to the evaluating means locating an un-supported feature, for defining a support structure for the un-supported feature;

means for generating a fabrication tool movement list expressive of movements required by a fabrication tool to fabricate the object and any defined support structures; and means for translating the fabrication tool in accordance with the generated fabrication tool movement list to fabricate the object and any defined support structures; wherein the definition is stored as a plurality of vectors representing the object and wherein the generating means includes means for converting the plurality of vectors to a plurality of horizontally disposed layers each of which is expressed in a bit mapped representation.

13. Apparatus for fabricating a three-dimensional object in accordance with a computer-generated definition of the object stored within a memory means, comprising:

means for evaluating the stored definition of the object to locate any un-supported features of the object;

means, responsive to the evaluating means locating an un-supported feature, for defining a support structure for the un-supported feature;

means for generating a fabrication tool movement list expressive of movements required by a fabrication tool to fabricate the object and any defined support structures; and means for translating the fabrication tool in accordance with the generated fabrication tool movement list to fabricate the object and any defined support structures; wherein the generating means includes means for analyzing the definition of the object to identify alias features associated with a surface of the object; and further includes means for adding surface features to the definition of the object for substantially anti-aliasing the surface.

14. Apparatus for fabricating a three-dimensional object in accordance with a computer-generated definition of the object stored within a memory means, comprising:

means for evaluating the stored definition of the object to locate any un-supported features of the object;

means, responsive to the evaluating means locating an un-supported feature, for defining a support structure for the un-supported feature;

means for generating a fabrication tool movement list expressive of movements required by a fabrication tool to fabricate the object and any defined support structures; and means for translating the fabrication tool in accordance with the generated fabrication tool movement list to fabricate the object and any defined support structures; and further comprising:

means for generating a feedback signal that is indicative of at least one characteristic of a most recently fabricated portion of the object; and means for monitoring the feedback signal to detect a deviation of at least a location of the most recently fabricated portion of the object from a corresponding location as expressed in the associated portion of the fabrication tool movement list.

15. Apparatus for fabricating a three-dimensional object in accordance with a computer-generated definition of the object, comprising:

means for evaluating the definition of the object to locate an aliased surface feature;

means, responsive to the evaluating means locating an aliased surface feature, for defining a compensating anti-aliasing surface feature;

means for generating a fabrication tool movement list expressive of movements required by the fabrication tool to fabricate the object and the anti-aliasing surface feature;

means for translating the fabrication tool in accordance with the generated fabrication tool movement list to fabricate the object and the anti-aliasing surface feature;

means for generating a feedback signal that is indicative of at least one characteristic of a most recently fabricated portion of the object; and means for monitoring the feedback signal to detect a deviation of at least a location of the most recently fabricated portion of the object from a corresponding location as expressed in the associated portion of the fabrication tool movement list.

* * * * *

UNITED STATES PATENT AND TRADEMARK OFFICE
CERTIFICATE OF CORRECTION

PATENT NO. : 5,402,351
DATED : March 28, 1995
INVENTOR(S) : J. Batchelder et al.

It is certified that error appears in the above-indentified patent and that said Letters Patent is hereby corrected as shown below:

Col. 1, line 65, delete "both" and insert --bath--therefor.

Col. 9, line 23, delete "a focal" and substitute --afocal--therefor.

Col. 9, line 43, delete "depth,resolved" and insert --depth-resolved--therefor.

Signed and Sealed this

Twenty-fourth Day of October, 1995

Attest:

BRUCE LEHMAN

Attesting Officer    Commissioner of Patents and Trademarks